(12) United States Patent
Kai

(10) Patent No.: US 11,237,775 B2
(45) Date of Patent: Feb. 1, 2022

(54) COMMUNICATION DEVICE, METHOD OF CONTROLLING COMMUNICATION DEVICE, AND NON-TRANSITORY COMPUTER-READABLE RECORDING MEDIUM THEREFOR

(71) Applicant: BROTHER KOGYO KABUSHIKI KAISHA, Nagoya (JP)

(72) Inventor: Takafumi Kai, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/818,461

(22) Filed: Mar. 13, 2020

(65) Prior Publication Data

US 2020/0301625 A1 Sep. 24, 2020

(30) Foreign Application Priority Data

Mar. 20, 2019 (JP) .............................. JP2019-052425

(51) Int. Cl.
*G06F 3/12* (2006.01)
*H04N 1/00* (2006.01)

(52) U.S. Cl.
CPC .......... *G06F 3/1209* (2013.01); *G06F 3/1206* (2013.01); *G06F 3/1245* (2013.01); *G06F 3/1287* (2013.01)

(58) Field of Classification Search
CPC .... G06F 3/1206; G06F 3/1209; G06F 3/1229; G06F 3/1231; G06F 3/1232;

(Continued)

(56) References Cited

U.S. PATENT DOCUMENTS

| 6,912,060 B1* | 6/2005 | Luciano | ............. H04N 1/00347 |
| | | | 358/1.1 |
| 2010/0067406 A1* | 3/2010 | Suzuki | .................. H04W 48/16 |
| | | | 370/254 |

(Continued)

FOREIGN PATENT DOCUMENTS

| JP | 2012-162034 A | 8/2012 |
| JP | 2015-185047 A | 10/2015 |

(Continued)

*Primary Examiner* — Chad Dickerson
(74) *Attorney, Agent, or Firm* — Scully Scott Murphy and Presser

(57) ABSTRACT

A communication device is configured to communicate with an information processing apparatus through a first communication interface using a first protocol, and communicate with an image processing apparatus having the image processing function through a second communication interface using a second protocol which is different from the first protocol. A controller of the communication device is configured to obtain particular information of the image processing apparatus from the image processing apparatus using the second protocol. When receiving a search request from the information processing apparatus, the controller responds to the search request based on the particular information as obtained. When receiving a first execution instruction from the information processing apparatus through the first communication interface using the first protocol, the controller transmits a second execution instruction in accordance with the first execution instruction to the image processing apparatus through the second communication interface using the second protocol.

9 Claims, 3 Drawing Sheets

(58) Field of Classification Search
CPC .... G06F 3/1244; G06F 3/1245; G06F 3/1287; G06F 3/1288; G06F 3/1292; G06F 3/1293; H04N 1/2315
USPC .......... 358/1.11–1.18; 709/201–203
See application file for complete search history.

(56) References Cited

U.S. PATENT DOCUMENTS

| | | | | |
|---|---|---|---|---|
| 2010/0303001 | A1* | 12/2010 | Tamura | H04W 88/06 370/315 |
| 2012/0274979 | A1* | 11/2012 | Uchida | G06F 3/1236 358/1.15 |
| 2013/0201519 | A1* | 8/2013 | Duyk | H04L 12/46 358/1.15 |
| 2015/0029540 | A1* | 1/2015 | Jo | G06F 3/1236 358/1.15 |
| 2015/0205550 | A1* | 7/2015 | Lee | G06F 3/1211 358/1.15 |

FOREIGN PATENT DOCUMENTS

| | | | |
|---|---|---|---|
| JP | 2015-185048 A | | 10/2015 |
| JP | 2015-186228 A | | 10/2015 |
| JP | 2015-187791 A | | 10/2015 |
| JP | 2015185048 A | * | 10/2015 |
| JP | 2018-181108 A | | 11/2018 |

* cited by examiner

COMMUNICATION DEVICE, METHOD OF CONTROLLING COMMUNICATION DEVICE, AND NON-TRANSITORY COMPUTER-READABLE RECORDING MEDIUM THEREFOR

CROSS-REFERENCE TO RELATED APPLICATIONS

This application claims priority under 35 U.S.C. § 119 from Japanese Patent Application No. 2019-052425 filed on Mar. 20, 2019. The entire subject matter of the application is incorporated herein by reference.

BACKGROUND

Technical Field

The present disclosures relate to a communication device configured to communicate with both an information processing apparatus and an image processing apparatus which is subjected to be controlled by the information processing apparatus. The present disclosures further relate to a method of controlling a communication device, and a non-transitory computer-readable recording medium storing instructions which cause, when executed, a controller to control the communication device.

Related Art

There has been known a technique of instructing a device which is not compliant to a particular protocol using the particular protocol. Specifically, there has been known a configuration in which a compliant device which is compliant to the particular protocol and a non-compliant device which is not compliant to the particular protocol are provided, and the compliant device is configured to receive an instruction directed, from a terminal device, to the non-compliant device, and the received instruction is transferred from the compliant device to the non-compliant device.

SUMMARY

According to the above-described conventional technique, the instruction by the terminal device is transferred to the non-compliant device through the compliant device. However, a novel technique enabling the non-compliant device to receive the instruction has been desired.

According to aspects the present disclosures, there is provided a communication device which does not have an image processing function, but has a first communication interface, a second communication interface and a controller. The communication device is configured to communicate with an information processing apparatus through the first communication interface using a first protocol. Further, the communication device is configured to communicate with an image processing apparatus having the image processing function through the second communication interface using a second protocol, which is different from the first protocol. The controller is configured to perform an obtaining process of obtaining particular information of the image processing apparatus from the image processing apparatus using the second protocol. When the controller receives a search request from the information processing apparatus, a responding process of responding to the search request based on the particular information of the image processing apparatus obtained in the obtaining process. When the controller receives a first execution instruction causing the image processing apparatus to perform image processing from the information processing apparatus through the first communication interface using the first protocol, a transmitting process of transmitting a second execution instruction in accordance with the first execution instruction to the image processing apparatus through the second communication interface using the second protocol.

According to aspects the present disclosures, there is provided a method of control a communication device which does not have an image processing function, the communication device having a first communication interface and a second communication interface. The communication device is configured to communicate with an information processing apparatus through the first communication interface using a first protocol. The communication device is configured to communicate with an image processing apparatus having the image processing function through the second communication interface using a second protocol, which is different from the first protocol. The method includes steps of obtaining particular information of the image processing apparatus from the image processing apparatus using the second protocol, when the controller receives a search request from the information processing apparatus, responding to the search request based on the particular information of the image processing apparatus as obtained, and the controller receives a first execution instruction causing the image processing apparatus to perform image processing from the information processing apparatus through the first communication interface using the first protocol, transmitting a second execution instruction in accordance with the first execution instruction to the image processing apparatus through the second communication interface using the second protocol.

According to aspects the present disclosures, there is provided a non-transitory computer-readable recording medium for a communication device which does not have an image processing function, the communication device having a first communication interface, a second communication interface and a controller. The communication device is configured to communicate with an information processing apparatus through the first communication interface using a first protocol. Further, the communication device is configured to communicate with an image processing apparatus having the image processing function through the second communication interface using a second protocol, which is different from the first protocol. The recording medium stores instructions which cause, when executed by the controller, the communication device to perform an obtaining process of obtaining particular information of the image processing apparatus from the image processing apparatus using the second protocol, when the controller receives a search request from the information processing apparatus, a responding process of responding to the search request based on the particular information of the image processing apparatus obtained in the obtaining process, and when the controller receives a first execution instruction causing the image processing apparatus to perform image processing from the information processing apparatus through the first communication interface using the first protocol, a transmitting process of transmitting a second execution instruction in accordance with the first execution instruction to the image processing apparatus through the second communication interface using the second protocol.

BRIEF DESCRIPTION OF THE ACCOMPANYING DRAWINGS

DETAILED DESCRIPTION OF THE EMBODIMENT

Hereinafter, referring to the accompanying drawings, a communication device 1 according to the present disclosures will be described. According to the embodiment, the communication device 1 is configured to communicate with both a personal computer (hereinafter, referred to as a PC) and a printer.

Figure 1:
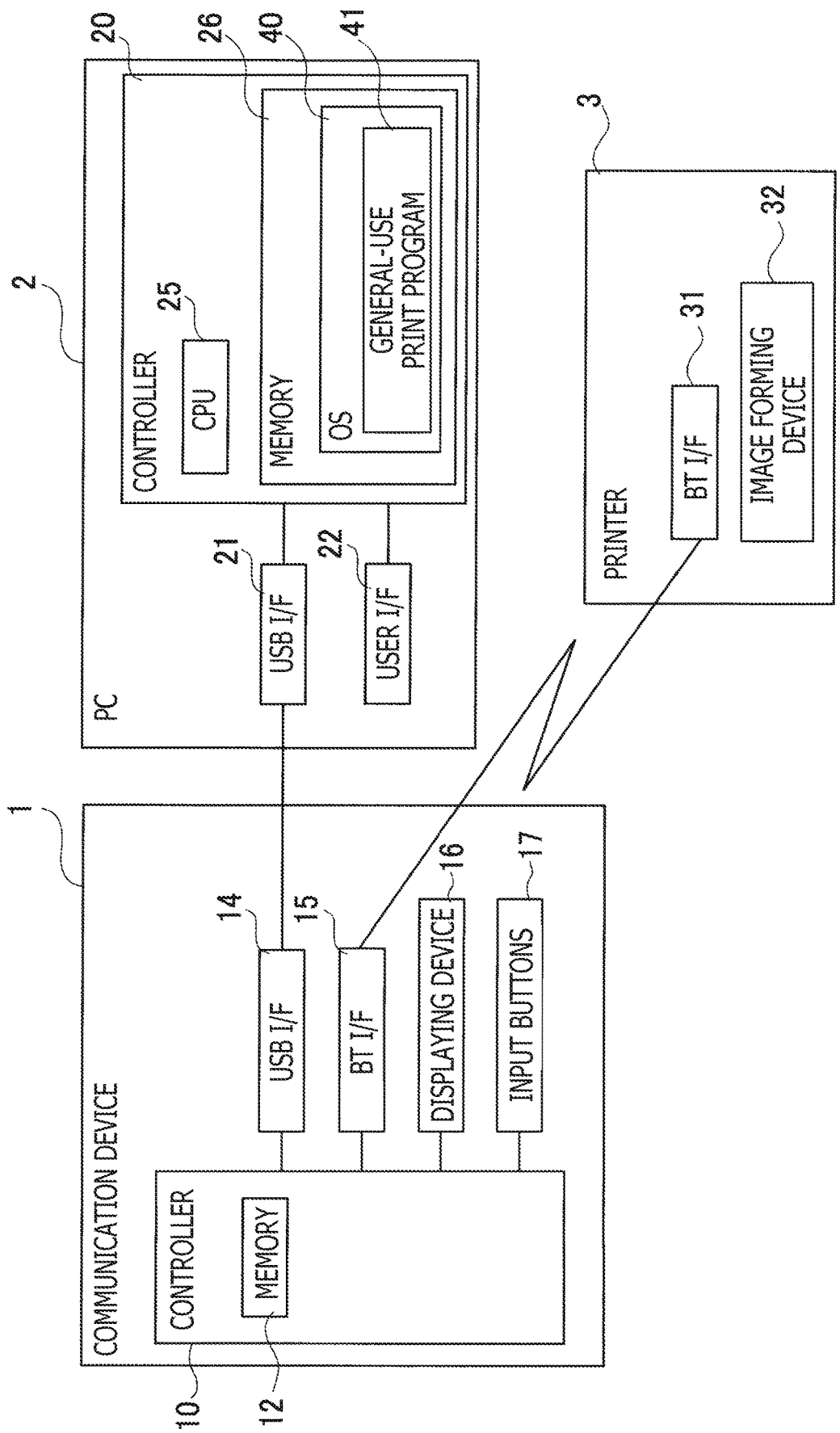
FIG. 1 is a block diagram showing an electrical configuration of a communication device, a PC and a printer.

The communication device 1 according to the present embodiment is, as shown in FIG. 1, provided with a controller 10 including a memory 12. The communication device 1 is further provided with a USB I/F 14, a Bluetooth I/F (hereinafter, referred to as BT I/F) 15, a displaying device 16 and inputting buttons 17, which are electrically connected to the controller 10. It is noted that the "controller" 10 is a collective name including hardware and software used to control the communication device 1. That is, the controller 10 does not necessarily mean a single piece of hardware provided inside the communication device 1.

The memory 12 is, for example, a flash memory and is configured to store various programs and various pieces of data. The USB I/F 14 is a communication interface for performing communication in accordance with a USB standard. The BT I/F 15 is a communication interface for performing communication in accordance with Bluetooth standard (hereinafter, referred to as a BT standard). The USB I/F 14 is an example of a first communication interface, while the BT I/F 15 is an example of a second communication interface.

The displaying device 16 is configured to visually notify a user of information regarding a status of the communication device 1. The displaying device 16 may be a display, LED lamps or a combination thereof. Input buttons 17 are members which receive user's inputting operations. It is noted that the communication device 1 may be provided with a touch panel which has functions of both the displaying device 16 and the input buttons 17.

It is noted that the communication device 1 according to the present disclosures does not have an image processing function. The communication device 1 does not have mechanically driven parts, and can be driven to function with a relatively small power and a relatively small voltage. Therefore, the communication device 1 does not require a power supply from an external power supplying device such a domestic AC power wattage or the like. The communication device 1 receives power from a power supply, such as, a built-in battery or a power line included in the USB I/F 14. In the following description, terms "device" and "apparatus" are used in a distinguished manner. That is, equipment configured to perform a relatively simple function, or equipment incorporated as a part of an apparatus will be referred to as a "device."

The communication device 1 according to the embodiment is connectable to the PC 2 and the printer 3 as shown in FIG. 1. The PC 2 is an apparatus configured to perform various processes and includes, as shown in FIG. 1, a controller 20 provided with a CPU 25 and a memory 26. It is noted that the PC 2 is an example of an information processing apparatus. The memory 26 is, for example, a ROM, a RAM, a non-volatile memory or a combination thereof. According to the embodiment, details of differences among such memories are not essential and any of them or other suitable memory may be employed. It is noted that the "controller" 20 is a collective name of aggregation of hardware and software used to control the PC 2. That is, controller 20 need not be a single hardware contained in the PC 2.

The PC 2 is further provided with a USB I/F 21 and a user I/F 22, which are electrically connected to the controller 20. The USB I/F 21 is a communication interface which is used to execute a communication compliant to the USB standard. The PC 2 is configured to communicate with external equipment, which is connected to the PC 2 through the USB I/F 21. It is noted that the PC 2 according to the embodiment has a plurality of communication interfaces in addition to the USB I/F 21, and is configured to be connected with various types of external equipment. It is noted that the user I/F 22 includes hardware configured to receive user input and display various pieces of information. The user I/F 22 may be, for example, a touch panel and/or a combination of keyboard/mouse and a display.

In recent years, as a technique of transmitting a print command from a PC to a printer, a so-called driverless printing technique is widely used. According to the driverless printing technique, an operating system (hereinafter, referred to as an OS) contains a general-use printing program and printing can be performed with use of the printing function, which is realized by the general-use printing program, of the OS. It is noted that, according to the driverless printing technique, printing can be performed without installing a printer driver in the PC.

As shown in FIG. 1, the PC 2 according to the embodiment is configured such that a general-use printing program 41 is implemented with the OS 40, which is stored in the memory 26. The OS may be, for example, Microsoft Windows®, MacOS® or Linux®. The general-use printing program 41 is a general-use program designed to perform various processes related to printing and is compliant to a plurality of types of printers which are provided by a plurality of vendors, respectively. The general-use printing program 41 may be, for example, AirPrint®, Mopria® and the like.

Signals generated by the general-use printing program 41 and containing a print command and the like are output using an Internet Printing Protocol (hereinafter, referred to as an IPP) as a communication protocol. It is noted that the IPP is an example of a first protocol. It is noted that equipment which is caused, by the general-use printing program, to perform printing is required to have been registered with the OS 40. When the PC 2 receives a registration instruction to register new equipment with the OS 40, the PC 2 outputs a search request to search connectable equipment. Further, the PC 2 outputs an inquiry signal inquiring capability and the like to the equipment which responds to the search request using the IPP. Only the equipment which correctly responds to the inquiry signal is registered with the OS 40. Further, when the PC receives, with use of the general-use printing program 41, a print instruction by a user, the PC 2 transmits a print command to designated equipment using the IPP.

It is noted that the printer 3 according to the embodiment is not compliant to the IPP. It is also noted that printers such as low-end ones, which are not compliant to the driverless printing technique or the communication using the IPP have been widely spreading. Such non-compliant printers do not correctly receive the print commands which are transmitted using the IPP. Since the printer 3 cannot correctly receive information which is transmitted using the IPP, the printer 3 may not correctly respond to the inquiry transmitted from the PC 2 using the IPP.

As shown in FIG. 1, the printer 3 according to the embodiment is provided with the BT I/F 31 and an image forming device 32, and is configured to perform printing on printing medium with use of the image forming device 32. It is noted that the printer 3 is an example of an image processing apparatus. The printer 3 has a printing profile for BT and capable of communicating with external equipment, which is connected through the BT I/F 31, using a particular protocol for BT (hereinafter, referred to as a BT protocol). It is noted that the BT protocol is an example of a second protocol. It is also noted that the printer 3 according to the embodiment may be a BT printer which only has the BT I/F 31 as the communication interface, or a printer which alternatively or optionally has a communication interface other than the BT I/F.

The communication device 1 according to the embodiment is compliant to both the IPP and the BT protocol. That is, the communication device 1 is capable of communicating with the PC 2, through the USB I/F 14, using the IPP, and is capable of communicating with the printer 3, through the BT I/F 15, using the BT protocol. The communication device 1 is configured, for example, to receive information which is output by the PC 2 using the IPP through the USB I/F 14 and to transmit the same, through the BT I/F 15, to the printer 3 using the BT protocol. Further, the communication device 1 is also configured to receive information output by the printer 3 using the BT protocol and to transmit the same, through the USB I/F 14, to the PC 2 using the IPP.

It is noted that the communication between the communication device 1 and the PC 2 may be any type of communications if the IPP, which is used by the general-use printing program 41, is used, and need not be limited to a communication through the USB I/F. For example, the communication between the communication device 1 and the PC 2 could be one through a wired LAN, Wi-Fi® or the like.

Figure 2:
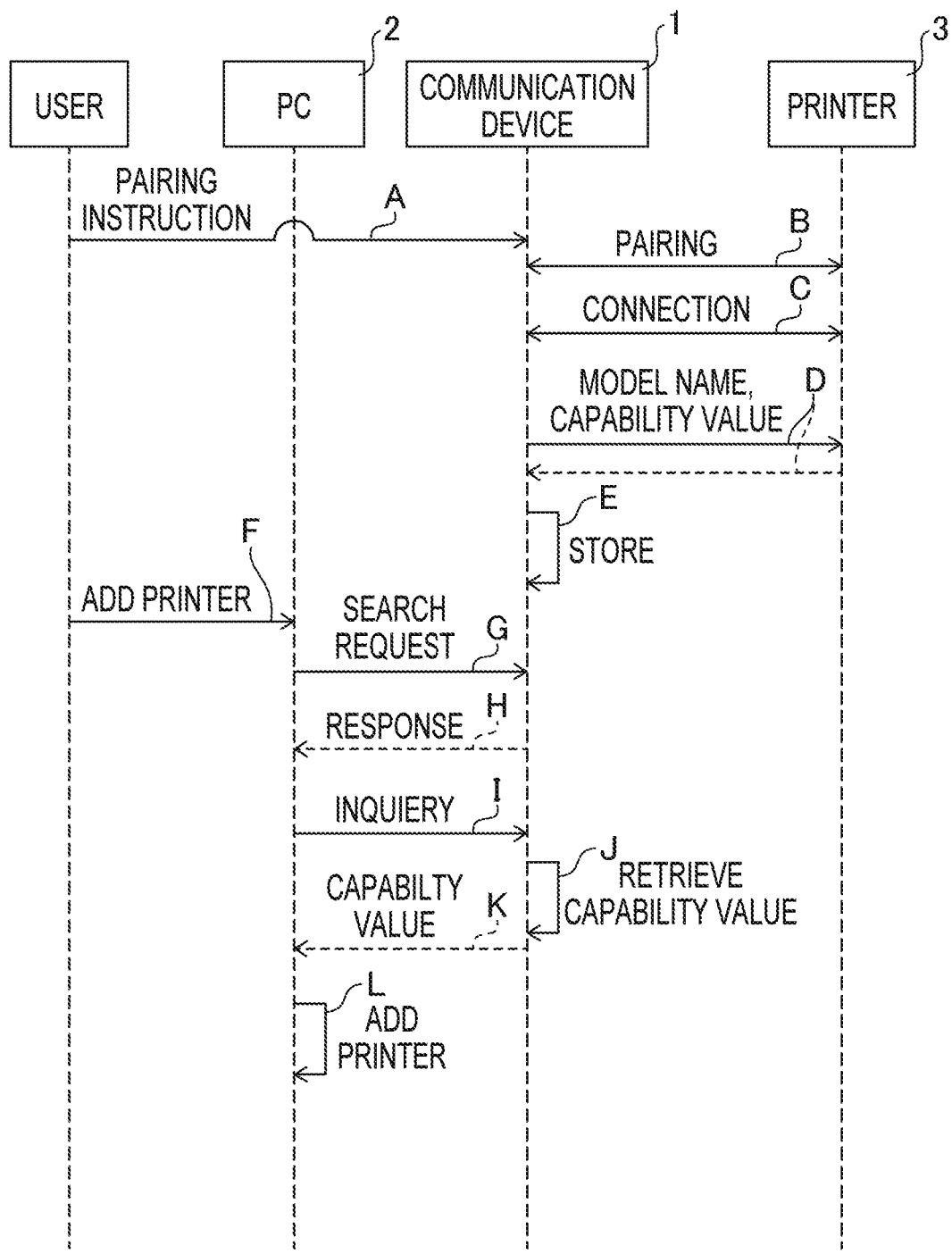
FIG. 2 is a sequence chart illustrating a procedure to add a printer.
Figure 3:
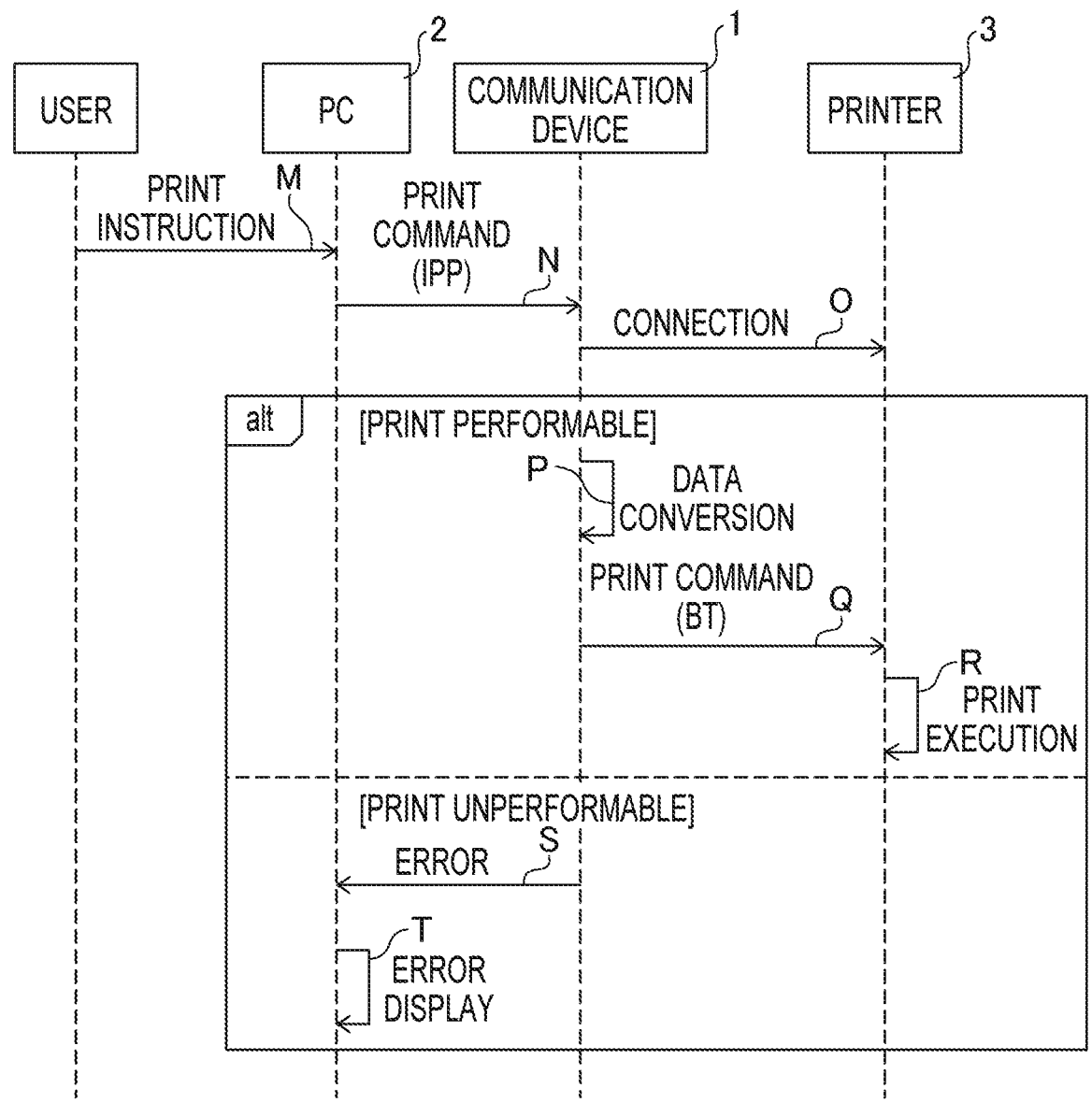
FIG. 3 is a sequence chart illustrating a procedure to perform printing.

Hereinafter, a process of causing the printer 3 to perform printing, using the communication device 1, in accordance with the print instruction received by the PC 2 through the general-use printing program 41 will be described referring to sequence charts shown in FIGS. 2 and 3.

Firstly, a process of registering the printer 3 with the OS 40 of the PC 2 as the printing apparatus will be described with reference to FIG. 2. It is noted that the process of the communication device 1 is performed by the controller 10 based on the program stored in the memory 10. Further, the processes of the PC 2 are performed by the CPU 25 based on programs such as the OS 40 and the general-use printing program 41 stored in the memory 26.

The user performs pairing of the communication device 1 and the printer 3 as a preparation procedure for the BT connection. Specifically, the user sets the printer 3 to a paring waiting state and inputs an instruction, through the input button 17 of the communication device 1, to start paring. In response to the user instruction to start paring (Arrow A), the communication device 1 performs paring with the printer 3 through the BT I/F 15 (Arrow B).

Specifically, the communication device 1 outputs a paring object searching signal through the BT I/F 15 and receives responding signals from the printers 3. The communication device 1 displays, on the displaying device 16, information regarding equipment (e.g., the printer 3) which is detected as the paring objects and receives a user instruction, through the input button 17, of designating one of the displayed paring objects. Further, in response to receipt of the user input to designate the printer 3, the communication device 1 transmits a paring signal to the printer 3 through the BT I/F 15 to establish paring between the communication device 1 and the printer 3.

Then, the communication device 1 is connected to the printer 3 through the BT I/F 15 (Arrow C). Specifically, the communication device 1 transmits a connection requesting signal to the printer 3 to attempt connection, and determines that the connection with the printer 3 is established when the communication device 1 receives a responding signal to the connection requesting signal from the printer 3. The process indicated by Arrow C is an example of establishment of communication connection. The connection between the communication device 1 and the printer 3 is the BT connection and one-to-one connection. Optionally, the communication device 1 may display that information should be obtained on the displaying device 16 to request for user's permission for connection, before the BT connection between the communication device 1 and the printer 3 is established.

When the connection is established, the communication device 1 transmits an inquiry to the printer 3 through the BT I/F 15 using the BT protocol and obtains the particular information regarding the printer 3 therefrom (Arrow D). It is noted that the process indicated by Arrow D is an example of an obtaining process. The particular information regarding the printer 3 includes, for example, information regarding a model name of the printer 3, a capability value, a node name and a device class. The information on the capability value is information indicating a range of print setting which can be set when the printer 3 is caused to perform printing. The information on the device class is used when information is traded between the information processing apparatus 1 and the communication device 2, and the printer 3 transmits information indicating a printer class as the device class to the communication device.

The communication device 1 stores information obtained from the printer 3 in the memory 12 (Arrow E). The process indicated by Arrow E is an example of a storing process. Thereafter, if the printer 3 is controlled to perform printing immediately, the user may once release the connection between the communication device 1 and the printer 3.

The PC 2 receives a printer addition instruction (Arrow F) by the user through the user I/F 22. As mentioned above, the PC 2 has registered apparatuses which can be controlled, by the general-use printing program 41 implemented in the OS 40, to perform printing with the OS 40, and the print instruction the PC 2 receives contains the user selection of one of the apparatuses having been registered. Therefore, if the user wants to cause the printer 3 to perform printing with use of the general-use printing program 41, the user needs to register information regarding the printer 3 with the OS 40. For this purpose, the user inputs, through the user I/F 22, the addition instruction, which is an instruction to additionally register an apparatus with the OS 40, to the PC 2.

When the PC 2 receives the addition instruction to add a printing apparatus by the user, the PC 2 outputs a search request to search for the apparatus subjected to be added (Arrow G). The search request is realized by a function of Bonjour® and is multicast through various interfaces provided to the PC 2. When an apparatus having an image processing function is connected to the USB I/F 21 of the PC 2, the PC 2 outputs the search request through the USB I/F 21.

According to the above configuration, the connection between the PC 2 and the communication device 1 should be established before the addition instruction. The user can physically connect the communication device 1 and the PC 2 by inserting a connector of the USB I/F 14 provided to the communication device 1 into the USB I/F 21. Then, a USB connection between the PC 2 and the communication device 1 is established. It is noted that the USB connection is a host-device connection which is established such that the PC 2 serves as a host and the communication device 1 serves as a device. The PC 2, which serves as the host, requests for device class information in order to categorize the device-side apparatus in conformity to the USB standard. Then, the communication device 1, in response to the request by the PC 2, retrieves the printer class as the device class information from information which has been obtained from the printer 3 and stored in the memory 12, and outputs the same to the PC 2. Thus, the PC 2 recognizes the device class of the communication device 1 connected through the USB I/F 21 as the printer class, and outputs the search request to the communication device 1 through the USB I/F 21.

The communication device 1 receives the search request, which is output by the PC 2 (Arrow G), through the USB I/F 14 and transmits a particular responding signal containing the model name of the printer 3 and the like to the PC 2 through the USB I/F 14 (Arrow H). It is noted that the process indicated by Arrow H is an example of a responding process.

When the PC 2 receives the addition instruction by the user, if the communication device 1 is not connected with the PC 2, or if the device class of the communication device 1 is not recognized as the printer class, the above-mentioned search request through the USB I/F 21 is not output. For example, when the processes of Arrows C-E described above have not been performed and the communication device 1 does not have the device class information regarding the printer 3 (e.g., when the communication device 1 is connected with the PC 2 in a state where the communication device 1 has not obtained the information regarding the printer 3), the communication device 1 may respond, in response to the request for the device class information transmitted from the PC 2, to indicate that the device class is a class other than the printer class or the still image class. With this configuration, since the PC 2 does not recognize the communication device 1 as a printer, it is suppressed that the communication device 1 is added to the OS 40 of the PC 2 as a kind of printers in a state where the communication between the PC 2 and the printer 3 is not established.

Further, the PC 2 transmits each of the apparatuses which have responded to the search request an inquiry signal inquiring capability (Arrow I). In response to the communication device 1 responding to the request (Arrow H), the PC 2 outputs an inquiry signal addressed to the communication device 1 through the USB I/F 21 using the IPP. In response to receipt of the inquiry signal through the USB I/F 14, the communication device 1 retrieves the capability value of the printer 3 from the information regarding the printer 3 stored in the memory 12 (Arrow J). Further, the communication device 1 transmits information regarding the retrieved capability value and information indicating that the communication device 1 is compliant to the general-use printing program 41 to the PC 2 through the USB I/F 14 using the IPP (Arrow K). It is noted that the process indicated by Arrow K is an example of the responding process.

Based on the information regarding the capability values as received, the PC 2 adds the communication device 1 which is an apparatus connected to the USB I/F 21 as one of the printers selectable using the general-use printing program 41 of the OS 30 (Arrow L). Accordingly, the user can select the communication device 1 as the printer 3 when the general-use printing program 41 of the OS 40 is being executed. If, for example, a name indicating the printer 3 is assigned when the communication device 1 is added, the user can easily recognize the communication device 1 and select the same when the user selects one of the registered printers.

It is noted that, by storing the information regarding the printer 3 in a process indicated by Arrow E, it becomes unnecessary that the communication device 1 and the printer 3 need not be connected when the processes of Arrows F-L are performed. Further, by storing the information regarding the printer 3, the communication device 1 can respond to the search request and/or the inquiry signal from the PC 2 earlier.

It is noted that the communication device 1 may obtain the information regarding the printer 3 after the search request is received from the PC 2, instead of obtaining the same, in advance, subsequent to paring. In such a case, the processes indicated by Arrows C-E may be performed after the process indicated by Arrow G and before the process indicated by Arrow K. According to such a configuration, the communication device 1 can respond to provide the latest information to the PC 2. Also, in such a case, by storing the obtained information in the memory 12, even if the communication device 1 is extracted from the PC 2 and then inserted to the PC 2, the communication device 1 can respond to the PC 2 as the printer 3 every time when the communication device 1 is connected to the PC 2.

Next, a process of receiving the print instruction by the user via the general-use printing program 41 and causing the printer 3 to perform printing will be described, referring to FIG. 3. The user executes the general-use printing program 41 on the PC 2, selects the image subjected to be printed and the apparatus to perform printing, and inputs the print instruction. In the following description, a case where the printer 3 is selected as the apparatus to perform printing will be described. The procedure shown in FIG. 3 is performed in a state where the procedure to add the printer as shown in FIG. 2 has been completed.

The PC 2 receives the print instruction of the user via the general-use printing program 41 implemented in the OS 40 (Arrow M). At this stage, if the communication device 1 is being connected with the USB I/F 21 and the PC 2 recognizes the communication device 1 as the printer 3, the PC 2 transmits a print command according to the received print instruction to the communication device 1 through the USB I/F 21 using the IPP. If the communication device is not connected at this stage, the PC 2 determines that the printer 3 is offline and displays an error message.

The communication device 1 receives the print command output by the PC 2 through the USB I/F 41 using the IPP (Arrow N). The print command output by the PC 2 is an example of an instruction to perform image processing, and the print command the communication device 1 receives in a process indicated by Arrow N is an example of a first execution instruction.

As the print command is received, the communication device 1 attempts to connect to the printer 3 (Arrow O). When the communication device 1 has already been connected with the printer 3, the procedure of Arrow O is skipped. After the communication device 1 is connected to the printer 3, the communication device 1 determines whether the printer 3 is in a print performable state. Concretely, the communication device 1 obtains, for example, information indicating the state of the printer 3 from the printer 3. When the communication device 1 receives the information indicating that the printer 3 is in a print performable state, the communication device 1 determines that the printer 3 is in the print performable state.

When the communication device determines that the printer 3 is in the print performable state, the communication device 1 converts the print command received from the PC 2 as needed (Arrow P). In the process indicated by Arrow P, the communication device 1 may only convert the IPP to the BT protocol, or may convert the print data to data suitable for the printer 3. Alternatively or optionally, the communication device 1 may convert the print command to, for example, PDF data or rasterized data.

The communication device 1 transmits the converted print command to the printer 3 through the BT I/F 15 using the BT protocol (Arrow Q). The process indicated by Arrow Q is an example of a transmitting process, and the print command transmitted from the communication device 1 to the printer 3 in the process indicated by Arrow Q is an example of a second execution instruction. It is noted that the communication device 1 may not only convert the print command received from the PC 2, but, for example, additionally receive parameters intrinsic to the printer or delete commands and/or parameters which are not compliant to the printer 3. By converting the print command to data compliant to the printer 3 when the print command contains commands/parameters which are not compliant to the printer 3 or a data format is not compliant to the printer 3, a possibility that user-desired printing is performed by the printer 3 is raised.

The printer received the print command from the communication device 1 through the BT I/F 31 and performs printing (Arrow R) in accordance with the received print command, thereby printed matter being generated by the printer 3.

When the communication device 1 determines that the printer 3 is in the print unperformable state, the communication device 1 responds to the PC 2 to inform an error state through the USB I/F 14 using the IPP (Arrow S). When, for example, the connection between the communication device 1 and the printer 3 is not established, and the printer 3 is in an error and stoppage state, the communication device 1 determines that the printer 3 is in the print unperformable state. When the PC 2 receives the response indicating the error state from the communication device 1, the PC 2 notifies the error state through the user IF 22 (Arrow T). Since the error state is notified through the user I/F 22 of the PC 2 when the printer 3 is the print unperformable state, the user can easily notice occurrence of the error state.

As described above in detail, the communication device 1 according to the embodiment outputs the information regarding the printer 3 in response to the search request from the PC 2. Then, the communication device 1 is registered as the printer 3 with the PC 2. Thereafter, when the communication device 1 receives the print command from the PC 2 using the IPP, the communication device 1 transmits the print command to the printer 3 using the BT protocol. According to this configuration, even if the printer 3 is not compliant to the IPP, the printer 3 is capable of performing printing in accordance with the print command transmitted from the PC 2. Further, it is noted that the communication device 1 is a device which is not provided with an image processing function. For a user who only has a low-end image processing apparatus which is not compliant to the IPP, it is advantageous to introduce the communication device 1 instead of replacing the image processing apparatus he/she owns with new one since such a user can use the general-use printing program 41 to control the image processing apparatus he/she owns simply by introducing the communication device 1.

It is noted that the above-described embodiment is only an example according to the present disclosures. Accordingly, the above-described configuration can be modified in various ways without departing from the aspects of the present disclosures. For example, the PC 2 may be replaced with a smartphone or a tablet terminal. The printer 3 may not be limited to a printer having only a printing function, but other devices such as a scanner, a copier, an MFP, a facsimile machine or the like. the number of the PC 2 and/or the printer 3 need not be limited to one but can be any number equal to or more than one.

According to the embodiment, paring between the communication device 1 and the printer 3 is performed using the displaying device 16 and the input button 17. It is noted that paring may be performed such that a program for paring is provided to the PC 2 and the paring between the communication device 1 and the printer 3 may be performed via the PC 2. Concretely, the communication device 1 may output a paring start signal to the printer 3 in accordance with a command from the PC 2 and receive a response signal from the printer 3 to the PC 2. Then, a user designation is input to the PC 2, and the communication device 1 may perform paring with the printer 3 in accordance with a signal transmitted from the PC 2.

It is noted that the communication device 1 may be configured to be paired with a plurality of devices/apparatuses. A user who has a plurality of printers can use the plurality of printers separately with use of a single communication device 1 by registering the plurality of printers with the PC 2. In such a case, the communication device 1 stores a plurality of pieces of information respectively corresponding to a plurality of pieces of identification information of respective printers in the memory 12 in an associated manner. Then, in response to the search request from the PC 2, the communication device 1 may select one that satisfies a particular condition from among the registered printers and respond to transmit printer information of the selected printer to the PC 2.

The communication device 1 may store, in advance, capacity information for respective models of the printers. Then, even if the connection between the communication device 1 and the printer 3 is not established, the communication device 1 may return, in response to a signal from the PC 2 compliant to the USB standard, the printer class as the device class information.

It is noted that in any of the flowcharts as disclosed, the order of the processes/steps can be changed as far as no conflicts occur. Optionally or alternatively, in any of the flowcharts as disclosed, a plurality of processes/steps may be executed in parallel as far as no conflicts occur.

It is noted that the processes disclosed in the embodiment may be performed by a single CPU, a plurality of CPU's, hardware such as an ASIC or a combination thereof. It is also noted that the processes disclosed in the embodiment may be realized in various modes (e.g., by a non-transitory recording medium containing instructions which realize programs for performing the processes, by a method of performing the processes and the like).

What is claimed is:

1. A communication device which does not have an image processing function, comprising:
a universal serial bus (USB) interface;
a wireless communication interface; and
a controller, wherein the communication device is configured to communicate with an information processing apparatus through the USB interface using a first protocol, wherein the communication device is configured to communicate with an image processing apparatus having the image processing function through the wireless communication interface using a second protocol, the second protocol being different from the first protocol, wherein the controller is configured to:
- obtain particular information of the image processing apparatus from the image processing apparatus using the second protocol;
- when the controller receives a search request from the information processing apparatus via the USB interface, respond, via the USB interface, to the search request based on the particular information of the image processing apparatus obtained; and
- when the controller receives a first execution instruction causing the image processing apparatus to perform image processing from the information processing apparatus through the USB interface using the first protocol, transmit a second execution instruction in accordance with the first execution instruction to the image processing apparatus through the wireless communication interface using the second protocol.

2. The communication device according to claim 1, further comprising a memory,
- wherein the controller is further configured to store, in the memory, the particular information of the image processing apparatus obtained,
- wherein, when the controller receives the search request from the information processing apparatus, the controller retrieves the particular information of the image processing apparatus from the memory and transmits the retrieved particular information of the image processing apparatus to the information processing apparatus.

3. The communication device according to claim 2,
- wherein obtaining the particular information is triggered by establishment of a communication connection with the image processing apparatus using the second protocol.

4. The communication device according to claim 1,
- wherein the controller obtains the particular information when the controller receives the search request from the information processing apparatus.

5. The communication device according to claim 1,
- wherein, when the controller receives the first execution instruction from the information processing apparatus using the first protocol, the controller attempts to establish a communication connection with the image processing apparatus using the second protocol, and
- when the communication connection is established, the controller transmits the second execution instruction; and
- when the communication connection is not established, the controller responds to indicate an error to the information processing apparatus using the first protocol without transmitting the second execution instruction.

6. The communication device according to claim 1,
- wherein the image processing apparatus is a printer,
- wherein, when the controller receives a print command from the information processing apparatus as the first execution instruction, the controller is configured to:
  - receive print data corresponding to the print command from the information processing apparatus;
  - convert the received print data to data corresponding to the second protocol; and
  - transmit the converted print data together with the second execution instruction to the printer.

7. The communication device according to claim 1,
- wherein, when the controller receives a request to notify a type of a device from the information processing apparatus in response to the communication device and the information processing apparatus being physically connected through the USB interface, the controller respond to transmit the type indicating an image processing apparatus.

8. A method of control a communication device which does not have an image processing function, the communication device having a universal serial bus (USB) interface and a wireless communication interface,
- wherein the communication device is configured to communicate with an information processing apparatus through the USB interface using a first protocol,
- wherein the communication device is configured to communicate with an image processing apparatus having the image processing function through the wireless communication interface using a second protocol, the second protocol being different from the first protocol,
- wherein the method includes:
  - obtaining particular information of the image processing apparatus from the image processing apparatus using the second protocol;
  - when the communication device receives a search request from the information processing apparatus via the USB interface, responding, via the USB interface, to the search request based on the particular information of the image processing apparatus as obtained; and
  - when the communication device receives a first execution instruction causing the image processing apparatus to perform image processing from the information processing apparatus through the USB interface using the first protocol, transmitting a second execution instruction in accordance with the first execution instruction to the image processing apparatus through the wireless communication interface using the second protocol.

9. A non-transitory computer-readable recording medium for a communication device which does not have an image processing function, the communication device having a universal serial bus (USB) interface, a wireless communication interface and a controller,
- wherein the communication device is configured to communicate with an information processing apparatus through the USB interface using a first protocol,
- wherein the communication device is configured to communicate with an image processing apparatus having the image processing function through the wireless communication interface using a second protocol, the second protocol being different from the first protocol,
- wherein the non-transitory computer-readable recording medium stores instructions which cause, when executed by the controller, the communication device to:
  - obtain particular information of the image processing apparatus from the image processing apparatus using the second protocol;
  - when the controller receives a search request from the information processing apparatus via the USB interface, respond, via the USB interface, to the search request based on the particular information of the image processing apparatus obtained; and when the controller receives a first execution instruction causing the image processing apparatus to perform image processing from the information processing apparatus through the USB interface using the first protocol, transmit a second execution instruction in accordance with the first execution instruction to the image processing apparatus through the wireless communication interface using the second protocol.

* * * * *